United States Patent
Marutani et al.

(10) Patent No.: US 6,716,951 B2
(45) Date of Patent: Apr. 6, 2004

(54) HEAT-RESISTANT METHACRYLIC COPOLYMERS, PRODUCTION PROCESS THEREOF AND OPTICAL ELEMENTS

(75) Inventors: Takao Marutani, Hiroshima (JP); Hiroki Hatakeyama, Hiroshima (JP); Yoshiko Sano, Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/181,774

(22) PCT Filed: Jan. 19, 2001

(86) PCT No.: PCT/JP01/00316

§ 371 (c)(1), (2), (4) Date: Jul. 22, 2002

(87) PCT Pub. No.: WO01/53365

PCT Pub. Date: Jul. 26, 2001

(65) Prior Publication Data

US 2003/0013829 A1 Jan. 16, 2003

(30) Foreign Application Priority Data

Jan. 21, 2000 (JP) .................................... 2000-012682
Jan. 16, 2001 (JP) .................................... 2001-007535

(51) Int. Cl.$^7$ ............................................. C08F 120/18
(52) U.S. Cl. ................. 526/329.7; 526/74; 526/319; 526/317.1; 526/324; 526/329.2; 526/346
(58) Field of Search ................. 526/329.7, 74, 526/319, 317.1, 324, 329.2, 346

(56) References Cited

FOREIGN PATENT DOCUMENTS

| EP | 536086 | | 9/1992 |
| JP | 57-153008 | | 9/1982 |
| JP | 59049253 A | * | 3/1984 |
| JP | 59-93707 | | 5/1984 |
| JP | 59202402 A | * | 11/1984 |
| JP | 59-221315 | | 12/1984 |
| JP | 61152758 | * | 7/1986 |

* cited by examiner

*Primary Examiner*—Tatyana Zalukaeva
(74) *Attorney, Agent, or Firm*—Oblon, Spivak, McClelland, Maier & Neustadt, P.C.

(57) ABSTRACT

A process for production of methacrylic copolymers, characterized by charging a monomer mixture comprising from 70 to 95% by weight of methyl methacrylate, from 0 to 15% by weight of α-methylstyrene, from 0 to 20% by weight of styrene and from 2 to 15% by weight of maleic anhydride at a molar ratio of the sum of α-methylstyrene and styrene to maleic anhydride laying within the range of 1.0 to 2.5 into a polymerizing vessel containing at least one polymeric membrane layer having an oxygen permeability of $1.5 \times 10^{-13}$ (mol·m$^{-2}$·s$^{-1}$·Pa$^{-1}$) or below, sealing the polymerizing vessel, and polymerizing the monomer mixture under heating in a gas phase; a methacrylic copolymer obtained by the production process which is reduced yellowing and shows excellent transparency and heat resistance; and an optical element composed of the methacrylic copolymer.

7 Claims, No Drawings

HEAT-RESISTANT METHACRYLIC COPOLYMERS, PRODUCTION PROCESS THEREOF AND OPTICAL ELEMENTS

TECHNICAL FIELD

The present invention relates to a heat-resistant methacrylic copolymer, a process of producing the same, and an optical element.

BACKGROUND ART

Generally, methacrylic resins containing methyl methacrylate as the main component are used in various fields such as illumination covers, automobile parts, sign boards, ornaments, general merchandises and the like, due to their heat resistance and remarkable transparency. However, the heat resistance of methacrylic resins is as insufficient as about 100° C., and application development thereof is restricted in considerable fields, consequently, improve in heat resistance is desired. Therefore, studies are conducted widely to improve the heat resistance of methacrylic resins, and there are some reports and suggestions.

For example, there are suggested a copolymer of methyl methacrylate, α-methylstyrene and maleic anhydride (JP-A No. 4-300907), a terpolymer of methyl methacrylate, styrene and maleic anhydride (JP-A No. 4-227613), a quaternary polymer of methyl methacrylate, α-methylstyrene, styrene and maleic anhydride (JP-A No. 61-271313), and the like.

As the method of polymerizing these ternary and quaternary polymers, a bulk polymerization method, solution polymerization method, suspension polymerization method and emulsion polymerization method are exemplified.

The emulsion polymerization method has a problem that since an emulsifier and a salting agent are used in the production process, these substances remain in a copolymer, and the resulted copolymer has lowered transparency and color tone. In the emulsion polymerization method and suspension polymerization method, since maleic anhydride is polymerized in water, maleic anhydride turns into maleic acid and production of a copolymer containing a maleic anhydride unit becomes difficult. Further, the solution polymerization method requires a solvent removal process, namely, is disadvantageous in cost.

On the other hand, the bulk polymerization method is advantageous in cost as compared with the solution polymerization method. As this bulk polymerization method, a continuous bulk polymerization method and a casting polymerization method are general. However, in the continuous bulk polymerization method, a large scale apparatus is necessary causing an enormous cost for the facility, and production of multiple products in small amounts is difficult. In the case of the casting polymerization method, general is a cell casting method in which raw materials such as monomers and the like are poured into glass cells or metal cells such as stainless and the like and the raw materials are heated in an aqueous phase or gas phase, however, when maleic anhydride is used, there are problems that peeling of a polymerized product from cells made of glass, metal and the like after polymerization is difficult, meaning poor workability, and the like. Further, the heating mode in an aqueous phase generates large cost necessary for the facility. Though the heating mode in a gas phase is advantageous in cost, when the thickness of a cell increases, heat removal in polymerization is small due to low heat conductivity of air, and heat generation in polymerization cannot be suppressed to cause a tendency of burst of a polymerization reaction, decrease in transparency of a polymerized product due to temperature disproportionation occurs easily, and other problems are caused.

For the purpose of improving heat removal from raw materials in this polymerization, there is also a method, for example, in which a monomer mixture is cast into a polymerizing vessel made of a thin material such as a nylon polymer film and the like and heated in a gas phase, to suppress burst of a polymerization reaction and temperature disproportionation in a polymerizing vessel. However, in this method, yellowing of a polymerized product of raw materials containing maleic anhydride is often remarkable. The copolymer showing remarkable yellowing is not easily utilized in optical elements and the like.

DISCLOSURE OF THE INVENTION

The present invention has been accomplished in view of the above-mentioned problems in conventional technologies and the object thereof is to provide a methacrylic copolymer which is polymerized under heating in a gas phase, reduced in yellowness, and excellent in transparency and heat resistance, a process of producing the same, and an optical element composed of a methacrylic copolymer.

The present inventors have intensively studied to attain the above-mentioned object, and resultantly found that yellowing after polymerization of a copolymer containing maleic anhydride can be improved by using a material having oxygen permeability of not more than specific value as a material of polymerizing vessel.

Namely, the present invention is a process for production of methacrylic copolymers, characterized by charging a monomer mixture comprising from 70 to 95% by weight of methyl methacrylate, from 0 to 15% by weight of α-methylstyrene, from 0 to 20% by weight of styrene and from 2 to 15% by weight of maleic anhydride at a molar ratio of the sum of α-methylstyrene and styrene to maleic anhydride laying within the range of 1.0 to 2.5 into a polymerizing vessel containing at least one polymeric membrane layer having an oxygen permeability of $1.5 \times 10^{-13}$ (mol $m^{-2} \cdot s^{-1} \cdot Pa^{-1}$) or below, sealing the polymerizing vessel, and polymerizing the monomer mixture under heating in a gas phase.

BEST MODES FOR CARRYING OUT THE INVENTION

In the present invention, the monomer mixture subjected to copolymerization comprises from 70 to 95% by weight of methyl methacrylate, from 0 to 15% by weight of α-methylstyrene, from 0 to 20% by weight of styrene and from 2 to 15% by weight of maleic anhydride, and has a molar ratio of the sum of α-methylstyrene and styrene to maleic anhydride laying within the range of 1.0 to 2.5.

In the present invention, the methyl methacrylate (hereinafter, described as "MMA") which is the main component constituting a methacrylic copolymer excellent in heat resistance is a component necessary for maintaining optical property, weather resistance and mechanical property inherent to a methacrylic resin, and used in an amount laying within the range of 70 to 95% by weight. Further, this amount is preferably 80% by weight or more. When this amount is less than 70% by weight, the above-mentioned properties are lost, and when over 95% by weight, heat resistance lowers.

The α-methylstyrene (hereinafter, described as "αMS") constituting a copolymer is a component which improves the copolymerization property of individual components in polymerizing a monomer mixture, and is one of components improving the heat resistance of the resulting copolymer, being used in an amount laying within the range of 0 to 15% by weight. Further, this amount is preferably 3% by weight or more, more preferably 6% by weight or more, and preferably 12% by weight or less. The content of αMS is preferably controlled by the content of other monomer. By increase in this content, the heat resistance of the resulting copolymer can be increased. When this content is over 15% by weight, mechanical property decreases, and the amount of remaining monomers in the resulted copolymer increases because of lowering of polymerization speed and deterioration of heat-resistant decomposing property, further, the copolymer tends to be colored easily or a coloring tendency is observed in molding a copolymer.

The styrene (hereinafter, described as "St") constituting a copolymer is a component which promotes copolymerization of MMA, αMS and maleic anhydride component. Though copolymerization property of MMA and maleic anhydride is poor, copolymerization property is improved by adding St and copolymerizing them, and a copolymer containing a small amount of unreacted monomers is obtained. By addition of St, the heat resistant decomposing property of the resulting copolymer can be improved, and the molding property of the copolymer can also be improved. However, when the addition amount of St is too large, the heat resistance of the resulting copolymer lowers, therefore, the addition amount is preferably controlled by the content of other monomer. St is used in an amount laying within the range of 0 to 20% by weight. Further, this amount is preferably 8% by weight or less.

The maleic anhydride (hereinafter, described as MAH) constituting a copolymer is one of components improving, like αMS, the heat resistance of a copolymer, and used in an amount laying within the range of 2 to 15% by weight. Further, this amount is preferably 8% by weight or less. Though this amount is required to be 2% by weight or more for imparting sufficient heat resistance to a copolymer, when over 15% by weight, yellowing of a copolymer becomes remarkable, and water absorption coefficient also increases.

The amounts of αMS, St and MAH used in the present invention are within the above-mentioned ranges, and additionally, they are used at a molar ratio of the sum of αMS and St to MAH laying within the range of 1.0 to 2.5. When this molar ratio is less than 1.0, yellowing of a copolymer becomes remarkable and appearance deteriorates. On the other hand, when the molar ratio is over 2.5, the transparency of a copolymer deteriorates, and the amount of unreacted monomers in a copolymer increases, and deterioration in physical properties tends to be caused such as decrease in strength of a molded article of a copolymer, foaming in molding, and the like.

In the present invention, further other monomers can be added to a monomer mixture, in an amount not deteriorating the physical properties of the resulting copolymer. As the other monomers, acids such as methacrylic acid, acrylic acid; acrylonitrile; maleimides such as N-phenylmaleimide, cyclohexylmaleimide; acrylates such as methyl acrylate, butyl acrylate, cyclohexyl acrylate; methacrylates other than MMA such as butyl methacrylate, cyclohexyl methacrylate, glycidyl methacrylate; polyethylene glycol di(meth)acrylates such as diethylene glycol di(meth)acrylate, triethylene glycol di(meth)acrylate; 1,4-butanediol di(meth)acrylate, 1,6-hexanediol di(meth)acrylate, trimethylolpropane tri(meth)acrylate, dipentaerythritol hexaacrylate and the like are listed. Further listed are monomers having a polyfunctional group such as saturated or unsaturated polyester poly(meth)acrylates composed of a condensate such as malonic acid/trimethylolethane/(meth)acrylic acid, succinic acid/trimethylolethane/(meth)acrylic acid and the like, and mixtures thereof.

In the process of production of the methacrylic copolymer excellent in heat resistance, polymerization is conducted in a gas phase. In conducting polymerization in a gas phase, heat removal tends to be insufficient, and foaming of the copolymerized substance composed of copolymer and burst of polymerization reaction due to polymerization heat generation, and the like, may occur in some cases. When the resulted copolymer contains much foaming, it is sometimes difficult to remove the copolymer from the polymerizing vessel after polymerization reaction. In this case, fragments of the polymerizing vessel are sometimes mixed in the resulted copolymer. In this case, optical property may deteriorate in a molded article obtained by molding a copolymer formed by grinding a copolymerized material. Further, when a polymerization reaction bursts, there is a possibility of breakage of a vessel itself in polymerization, causing a crisis. Then, if a terpenoid compound is further added to a monomer mixture and these are polymerized, polymerization peak temperature can only be lowered with scarce change of polymerization peak time, and foaming by polymerization heat generation and burst of a polymerization reaction can be prevented.

As the terpenoid compound, compounds such as terpinolene, myrcene, limonene, α-pinene, β-pinene, α-terpinene, β-terpinene, γ-terpinene and the like are listed.

It is necessary to control the addition amount of a terpenoid compound selected, depending on various conditions such as the addition amount of each monomer, the amount of a polymerization initiator, polymerization temperature and the like, since an effect of suppressing polymerization peak temperature differs depending on the kind of a terpenoid compound. In general, this addition amount is preferably from 0.0001 to 0.1 part by weight per 100 parts by weight of a monomer mixed. Further, this amount is more preferably 0.05 parts by weight or less. When the addition amount is too small, an effect of suppressing polymerization peak temperature lowers. When the addition amount is too large, decrease in physical properties of a copolymer obtained by increasing the amount of unreacted remaining monomers tends to be caused.

In the present invention, a polymerization initiator is usually used for polymerization of a monomer mixture. As the polymerization initiator, known compounds can be used. It is also possible to used a plurality of polymerization initiators together. For example, it is also possible to control time until polymerization completion, by combining a plurality of polymerization initiators having different 10 hour half life temperatures.

The polymerizing vessel used in the present invention is required to have at least one polymeric membrane layer (hereinafter, described as "oxygen shielding membrane" having an oxygen permeability of $1.5 \times 10^{-13}$ $(mol \cdot m^{-2} \cdot s^{-1} \cdot Pa^{-1})$ or below. When the oxygen permeability is over $1.5 \times 10^{-13}$ $(mol \cdot m^{-2} \cdot s^{-1} \cdot Pa^{-1})$, the resulting copolymer tends to be yellowed. The oxygen permeability is preferably lower, and more preferably $1.5 \times 10^{-4}$ $(mol \cdot m^{-2} \cdot s^{-1} \cdot Pa^{-1})$ or below. This oxygen permeability is measured according to the same manner as in JIS K7126 method B excepting a temperature of 20° C. and a humidity of 0%.

The thickness of an oxygen shielding membrane is preferably 5 μm or more, more preferably 10 μm or more, in view of its strength. From the standpoints of heat conductivity, handling easiness, processability into a polymerizing vessel and the like, the thickness is preferably 1000 μm or less, more preferably 500 μm or less.

The form of the polymerizing vessel is not particularly restricted provided that a monomer mixture can be poured into the polymerizing vessel, preferably oxygen dissolved and remaining in a monomer mixture can be removed, and then, the polymerizing vessel can be sealed. From the standpoint of easy handling, a polymerizing vessel in the form of bag made of a material having an oxygen shielding membrane is preferable.

As the material of the oxygen shielding membrane, polyvinyl alcohol, polyvinylidene chloride, ethylene-vinyl alcohol copolymer, polyacrylonitrile and the like are listed. When a commercially available film is used as the oxygen shielding membrane, commercially available products having trade names such as Eval (manufactured by Kuraray Co., Ltd.), Vobron, Vobron SE (both manufactured by Nippon Synthetic Chemical Industry Co., Ltd.), Embler (manufactured by Unitika Ltd.) and the like, for example, can be used. When a material used for the oxygen shielding membrane is easily dissolved in a monomer mixture used in the present invention, it may be permissible that other material not being dissolved is laminated on the surface side in contact with a monomer mixture, and the resulted multi-layer structure sheet or multi-layer structure film containing an oxygen shielding membrane is used. By multi-layer structure, strength increases, easy processability is obtained, a copolymer is easily peeled after polymerization, and other merits are obtained. Specifically, multi-layer structure sheets or multi-layer structure films are mentioned obtained by pasting a film of polypropylene, polyethylene, polyester, nylon and the like onto a film of polyvinyl alcohol, polyvinylidene chloride, ethylene-vinyl alcohol copolymer and the like.

The thickness of a material constituting the polymerizing vessel containing an oxygen shielding membrane is preferably 10 μm or more, more preferably 20 μm or more in view of its strength. From the standpoints of heat conductivity, handling easiness of a polymerizing vessel, processability into a polymerizing vessel and the like, the thickness is preferably 1000 μm or less, more preferably 500 μm or less.

When the concentration of oxygen dissolved and remaining in the prepared monomer mixture is high, the resulted copolymer is yellowed, consequently, it is preferable that the concentration of oxygen dissolved and remaining is as low as possible. Specifically, it is preferably 10 ppm or less, more preferably 1 ppm or less. As the method of removing oxygen dissolved and remaining, there are listed a method in which a monomer mixture is subjected to deairing under reduced pressure in a vacuum box, a method in which a nitrogen gas is directly blown into a monomer mixture for decades of minutes, and other methods. Also, the water content in the prepared monomer mixture is preferably lower. Further, also when a polymer obtained by grinding a polymerized substance is made into a molded article such as pellets, optical elements and the like by melt-extrusion, it is desirable to decrease the influence of oxygen. For example, a method of forming a molded article such as pellets, optical elements and the like by melting a polymer while flowing a nitrogen gas into an extruder, and other methods are listed.

The thickness of a polymerizing vessel after sealing a monomer mixture into the polymerizing vessel affects controllability of a polymerization reaction. In general, when the thickness is increased, production amount increases, however, heat removal in polymerization becomes difficult and control of a polymerization tends to be lost, and the polymerizing vessel may be broken, in some cases. When the thickness is small, control of a polymerization is easy, however, the amount of materials which can be polymerized at one time decreases. Therefore, thickness may be appropriately set depending on conditions of the facility and the like. From the standpoints of controllability of a polymerization reaction and productivity, it is desired that the thickness in polymerization is set at about 2 cm to 5 cm.

For heating in a gas phase polymerization, general heating furnaces utilizing vapor and an electric heater may be advantageously utilized. However, when temperature distribution occurs in polymerization, composition distribution occurs in a copolymer to lower the transparency of the copolymer in some cases. Therefore, higher gas volume in a heating furnace is desirable, also to smoothly remove heat in polymerization and not to lose control of polymerization.

The methacrylic copolymer excellent in heat resistance of the present invention is suitable for optical elements such as illumination covers, automobile tale lamp parts, information recording medium substrates, light connectors, pick up lenses mounted on photoelectron appliances utilizing semiconductor laser, projector lenses and the like, because of excellent heat resistance.

The present invention will be illustrated specifically based on examples and comparative examples below. In examples, heat distortion temperature was measured according to JIS-K7207, and "total light transmittance" and "haze" and "YI (yellow index)" were measured according to JIS-K7105. The polymerization peak temperature was measured under condition of pasting the tip of thermocouple to the surface of polymerizing vessel.

EXAMPLE 1

In a vessel equipped with a stirring apparatus, 82% by weight of MMA, 12% by weight of αMS and 6% by weight of MAH were mixed and stirred so that the total weight was 3 kg, and to this mixed solution having a total weight of 3 kg was added 2700 ppm of n-octylmercaptane and 900 ppm of a polymerization initiator [manufactured by NOF Corp., trade name: Perbutyl O, 10 hour half life temperature: 72° C.], to prepare a monomer mixture.

This monomer mixture was charged into a polymerizing vessel in the form of bag having an inner size of 32 cm square constituted of a multi-layer film composed of the innermost layer which is a polyethylene film of 100 μm, the intermediate layer which is an oxygen shielding membrane (trade name: Vobron SE, manufactured by Nippon Synthetic Chemical Industry Co., Ltd.) having an oxygen permeability of $2.4 \times 10^{-15}$ $(mol \cdot m^{-2} \cdot s^{-1} \cdot Pa^{-1})$ made of an ethylene-vinyl alcohol copolymer film of 12 μm and the outer layer which is a polyethylene terephthalate film of 100 μm, and a purified nitrogen gas was bubbled for 50 minutes at a rate of 100 ml/min. to control the concentration of oxygen dissolved and remaining to 10 ppm or below, then, the vessel was sealed to give a bag. This bag had a thickness of 4 cm. This bag was placed in an air heating furnace, and polymerization was conducted at 72° C. The polymerization peak was observed 27 hours after placing into the heating furnace. The polymerization peak temperature was 114° C. After 30 hours passed, the bag was removed, then, polymerization at 130° C. was conducted for 2 hours. The resulted copolymer had foaming, however, peeling off of the multi-layer film showed no problem.

The resulted copolymer was coarsely ground by a grinder, and pelletized with an extruder equipped with a vent while flowing a purified nitrogen gas from a hopper into a barrel, and this pellet was injection-molded to obtain a molded plate having a thickness of 4 mm. This molded plate had a heat distortion temperature of 118° C., a total light transmittance of 92.0%, a haze of 0.6 and a YI value of 1.9, and the resulted methacrylic copolymer had reduced yellowing, and excellent transparency and heat resistance.

EXAMPLE 2

In a vessel equipped with a stirring apparatus, 85% by weight of MMA, 9% by weight of αMS and 6% by weight of MAH were mixed and stirred so that the total weight was 15 kg, and to this mixed solution having a total weight of 15 kg was added 3000 ppm of n-octylmercaptane, 1100 ppm of a polymerization initiator (Perbutyl O) and 50 ppm of a polymerization initiator [manufactured by NOF Corp., trade name: Perhexa MC, 10 hour half life temperature: 85° C., 100° C.], to prepare a monomer mixture.

This monomer mixture was charged into a polymerizing vessel in the form of bag having an inner size of 70 cm×60 cm constituted of a two-layer film composed of the outer layer which is an oxygen shielding membrane (trade name: Vobron SE, manufactured by Nippon Synthetic Chemical Industry Co., Ltd.) having an oxygen permeability of 1.5× $10^{-15}$ (mol·m$^{-2}$·s$^{-1}$·Pa$^{-1}$) made of a polyvinyl alcohol film of 14 μm and the inner layer which is a polypropylene film of 40 μm, and a purified nitrogen gas was bubbled for 50 minutes at a rate of 100 ml/min. to control the concentration of oxygen dissolved and remaining to 10 ppm or below, then, the vessel was sealed to give a bag. This bag had a thickness of 4 cm. This bag was placed in an air heating furnace, and polymerization was conducted at 72° C. The polymerization peak was observed 19 hours after placing into the heating furnace. The polymerization peak temperature was 110° C. After 22 hours passed, the bag was removed, then, polymerization at 130° C. was conducted for 2 hours. The resulted copolymer had foaming, however, peeling off of the multi-layer film showed no problem.

Thereafter, the same procedure as in Example 1 was conducted to obtain a molded plate having a thickness of 4 mm. This molded plate had a heat distortion temperature of 120° C., a total light transmittance of 92.0%, a haze of 0.3 and a YI value of 1.8, and the resulted methacrylic copolymer had reduced yellowing, and excellent transparency and heat resistance.

EXAMPLE 3

In a vessel equipped with a stirring apparatus, 86% by weight of MMA, 6% by weight of αMS, 3% by weight of St and 5% by weight of MAH were mixed and stirred so that the total weight was 15 kg, and to this mixed solution having a total weight of 15 kg was added 3000 ppm of n-octylmercaptane and 800 ppm of a polymerization initiator (Perbutyl O), to prepare a monomer mixture. Thereafter, the same procedure as in Example 2 was conducted to obtain a bag having a thickness of 4 cm.

This bag was placed in an air heating furnace, and polymerization was conducted at 72° C. The polymerization peak was observed 28 hours after placing into the heating furnace. The polymerization peak temperature was 110° C. After 30 hours passed, the bag was removed, then, polymerization at 130° C. was conducted for 2 hours. The resulted copolymer had foaming, however, peeling off of the multi-layer film showed no problem.

Thereafter, the same procedure as in Example 1 was conducted to obtain a molded plate having a thickness of 4 mm. This molded plate had a heat distortion temperature of 115° C., a total light transmittance of 92.0%, a haze of 0.3 and a YI value of 1.5, and the resulted methacrylic copolymer had reduced yellowing, and excellent transparency and heat resistance.

EXAMPLE 4

In a vessel equipped with a stirring apparatus, 86% by weight of MMA, 6% by weight of αMS, 3% by weight of St and 5% by weight of MAH were mixed and stirred so that the total weight was 7.5 kg, and to this mixed solution having a total weight of 7.5 kg was added 3000 ppm of n-octylmercaptane, 1150 ppm of a polymerization initiator (Perbutyl O) and 55 ppm of a polymerization initiator (Perhexa MC) to prepare a monomer mixture. Thereafter, the same procedure as in Example 2 was conducted to obtain a bag having a thickness of 2 cm.

This bag was placed in an air heating furnace, and polymerization was conducted at 72° C. The polymerization peak was observed 16 hours after placing into the heating furnace. The polymerization peak temperature was 114° C. After 19 hours passed, the bag was removed, then, polymerization at 130° C. was conducted for 2 hours. The resulted copolymer had foaming, however, peeling off of the multi-layer film showed no problem.

Thereafter, the same procedure as in Example 1 was conducted to obtain a molded plate having a thickness of 4 mm. This molded plate had a heat distortion temperature of 115° C., a total light transmittance of 92.0%, a haze of 0.3 and a YI value of 1.5, and the resulted methacrylic copolymer had reduced yellowing, and excellent transparency and heat resistance.

EXAMPLE 5

In a vessel equipped with a stirring apparatus, 77% by weight of MMA, 13% by weight of St and 10% by weight of MAH were mixed and stirred so that the total weight was 8.0 kg, and to this mixed solution having a total weight of 8.0 kg was added 2000 ppm of n-octylmercaptane and 480 ppm of a polymerization initiator [manufactured by NOF Corp., trade name: Perloyl L, 10 hour half life temperature: 62° C.], to prepare a monomer mixture. Thereafter, according to the same procedure as in Example 2, a purified nitrogen gas was bubbled for 90 minutes at a rate of 100 ml/min. to control the concentration of oxygen dissolved and remaining to 1 ppm or below, then, a bag having a thickness of 2 cm was obtained.

This bag was placed in an air heating furnace, and polymerization was conducted at 60° C. The polymerization peak was observed 15 hours after placing into the heating furnace. The polymerization peak temperature was 95° C. After 22 hours passed, the bag was removed, then, polymerization at 130° C. was conducted for 2 hours. The resulted copolymer had foaming, however, peeling off of the multi-layer film showed no problem.

Thereafter, the same procedure as in Example 1 was conducted to obtain a molded plate having a thickness of 4 mm. This molded plate had a heat distortion temperature of 116° C., a total light transmittance of 92.0%, a haze of 0.3 and a YI value of 1.8, and the resulted methacrylic copolymer had reduced yellowing, and excellent transparency and heat resistance.

EXAMPLE 6

In a vessel equipped with a stirring apparatus, 81% by weight of MMA, 3% by weight of αMS, 8% by weight of St and 8% by weight of MAH were mixed and stirred so that the total weight was 8.0 kg, and to this mixed solution having a total weight of 8.0 kg was added 2000 ppm of n-octylmercaptane, 150 ppm of terpinolene and 480 ppm of a polymerization initiator [manufactured by NOF Corp., trade name: Perloyl L, 10 hour half life temperature: 62° C.], to prepare a mixture. Thereafter, polymerization was conducted in the same procedure as in Example 4. The polymerization peak was observed 17 hours after placing into the heating furnace, and the copolymer was removed after 22 hours passed, then, polymerization was conducted at 130° C. for 2 hours. The polymerization peak temperature was 90° C. The resulted copolymer had few foaming, and peeling off of the multi-layer film was easy.

Thereafter, the same procedure as in Example 1 was conducted to obtain a molded plate having a thickness of 4 mm. This molded plate had a heat distortion temperature of 115° C., a total light transmittance of 92.0%, a haze of 0.3 and a YI value of 1.5, and the resulted methacrylic copolymer had reduced yellowing, and excellent transparency and heat resistance.

EXAMPLE 7

Polymerization was conducted in the same manner as in Example 5 except that 150 ppm of terpinolene was added. The polymerization peak was observed 15 hours after placing into the heating furnace. The polymerization peak temperature was 84° C. The resulted copolymer had less foaming as compared with the copolymer in Example 5, and peeling off of the multi-layer film was easy.

Thereafter, the same procedure as in Example 1 was conducted to obtain a molded plate having a thickness of 4 mm. This molded plate had a heat distortion temperature of 115° C., a total light transmittance of 92.0%, a haze of 0.3 and a YI value of 1.9, and the resulted methacrylic copolymer had reduced yellowing, and excellent transparency and heat resistance.

COMPARATIVE EXAMPLE 1

A molded plate having a thickness of 4 mm was obtained in the same manner as in Example 1 except that a polymerizing vessel in the form of bag made of nylon having a thickness of 50 $\mu$m [oxygen permeability: $2.55 \times 10^{-13}$ $(mol \cdot m^{-2} \cdot s^{-1} \cdot Pa^{-1})$] was used. This molded plate had a YI value of 7.0, indicating very strong yellowing.

COMPARATIVE EXAMPLE 2

A molded plate having a thickness of 4 mm was obtained in the same manner as in Example 2 except that a polymerizing vessel in the form of bag made of nylon having a thickness of 100 $\mu$m [oxygen permeability: $1.79 \times 10^{-13}$ $(mol \cdot m^{-2} \cdot s^{-1} \cdot Pa^{-1})$] was used. This molded plate had a YI value of 5.4, indicating very strong yellowing.

COMPARATIVE EXAMPLE 3

A molded plate having a thickness of 4 mm was obtained in the same manner as in Example 5 except that a polymerizing vessel in the form of bag made of nylon having a thickness of 100 $\mu$m [oxygen permeability: $1.79 \times 10^{-13}$ $(mol \cdot m^{-2} \cdot s^{-1} \cdot Pa^{-1})$] was used. This molded plate had a YI value of 5.8, indicating very strong yellowing.

COMPARATIVE EXAMPLE 4

A molded plate having a thickness of 4 mm was obtained in the same manner as in Example 5 except that 98.5% by weight of MMA, 1% by weight of St and 0.5% by weight of MAH were used and the total weight was 8 kg. This molded plate had a heat distortion temperature of 103° C.

COMPARATIVE EXAMPLE 5

A molded plate having a thickness of 4 mm was obtained in the same manner as in Example 5 except that 60% by weight of MMA, 22% by weight of St and 18% by weight of MAH were used and the total weight was 8 kg. This molded plate had a YI value of 8.0, indicating very strong yellowing.

COMPARATIVE EXAMPLE 6

A molded plate having a thickness of 4 mm was obtained in the same manner as in Example 5 except that 76% by weight of MMA, 18% by weight of St and 6% by weight of MAH were used and the total weight was 8 kg. This molded plate had a haze of 3.1, indicating very strong turbidity.

COMPARATIVE EXAMPLE 7

A molded plate having a thickness of 4 mm was obtained in the same manner as in Example 5 except that 72% by weight of MMA, 13% by weight of St and 15% by weight of MAH were used and the total weight was 8 kg. This molded plate had a YI value of 5.1, indicating very strong yellowing.

The compositions and physical property values and the like in Examples 1 to 7 and Comparative Examples 1 to 7 are summarized in the flowing Table 1.

TABLE 1

|  | EX. 1 | EX. 2 | EX. 3 | EX. 4 | EX. 5 | EX. 6 | EX. 7 |
|---|---|---|---|---|---|---|---|
| Composition |  |  |  |  |  |  |  |
| Methyl methacrylate (wt. %) | 82 | 85 | 86 | 86 | 77 | 81 | 77 |
| α-Methylstyrene (wt. %) | 12 | 9 | 6 | 6 | 0 | 3 | 0 |
| Styrene (wt. %) | 0 | 0 | 3 | 3 | 13 | 8 | 13 |
| Maleic anhydride (wt. %) | 6 | 6 | 5 | 5 | 10 | 8 | 10 |
| Terpinolene (parts by weight per 100 parts by weight of monomer mixture) | 0 | 0 | 0 | 0 | 0 | 0.015 | 0.015 |
| Molar ratio (X-1) | 1.66 | 1.25 | 1.56 | 1.56 | 1.23 | 1.25 | 1.23 |
| Physical Property Value |  |  |  |  |  |  |  |
| Heat distortion temperature (° C.) | 118 | 120 | 115 | 115 | 116 | 115 | 115 |
| Total light transmittance (%) | 92.0 | 92.0 | 92.0 | 92.0 | 92.0 | 92.0 | 92.0 |
| Haze (%) | 0.6 | 0.3 | 0.3 | 0.3 | 0.3 | 0.3 | 0.3 |

TABLE 1-continued

| | | | | | | | |
|---|---|---|---|---|---|---|---|
| YI value | 1.9 | 1.8 | 1.5 | 1.5 | 1.8 | 1.5 | 1.9 |

| | Comp. EX. 1 | Comp. EX. 2 | Comp. EX. 3 | Comp. EX. 4 | Comp. EX. 5 | Comp. EX. 6 | Comp. EX. 7 |
|---|---|---|---|---|---|---|---|
| Composition | | | | | | | |
| Methyl methacrylate (wt. %) | 82 | 85 | 77 | 98.5 | 60 | 76 | 72 |
| α-Methylstyrene (wt. %) | 12 | 9 | 0 | 0 | 0 | 0 | 0 |
| Styrene (wt. %) | 0 | 0 | 13 | 1 | 22 | 18 | 13 |
| Maleic anhydride (wt. %) | 6 | 6 | 10 | 0.5 | 18 | 6 | 15 |
| Terpinolene (parts by weight per 100 parts by weight of monomer mixture) | 0 | 0 | 0 | 0 | 0 | 0 | 0 |
| Molar ratio (※1) | 1.66 | 1.25 | 1.23 | 1.88 | 1.15 | 2.83 | 0.81 |
| Physical Property Value | | | | | | | |
| Heat distortion temperature (° C.) | — | — | — | 103 | — | — | — |
| Total light transmittance (%) | — | — | — | — | — | — | — |
| Haze (%) | — | — | — | — | — | 3.1 | — |
| YI value | 7.0 | 5.4 | 5.8 | — | 8.0 | — | 5.1 |

(※1) Molar ratio of the sum of α-methylstyrene and styrene to maleic anhydride

As described above, according to the present invention, a methacrylic copolymer having reduced yellowing and excellent transparency and heat resistance can be obtained by using a material having low oxygen permeability as a material of polymerizing vessel. Further, the copolymer obtained according to the present invention has reduced yellowing and shows excellent transparency. From the copolymer of the present invention, an optical element having excellent heat resistance, reduced yellowing and excellent transparency is obtained.

What is claimed is:

1. A process for production of methacrylic copolymers, comprising:
    charging a monomer mixture comprising from 70 to 95% by weight of methyl methacrylate, from 0 to 15% by weight of α-methylstyrene, from 0 to 20% by weight of styrene and from 2 to 15% by weight of maleic anhydride into a polymerizing vessel containing at least one polymeric membrane layer having an oxygen permeability of $1.5 \times 10^{-13}$ (mol·m$^{-2}$·s$^{-1}$·Pa$^{-1}$) or below, where when styrene or α-methylstyrene is present the molar ratio of the sum of α-methylstyrene and styrene to maleic anhydride is from 1.0 to 2.5,
    sealing the polymerizing vessel, and
    polymerizing the monomer mixture under healing in a gas phase.

2. The process for production of methacrylic copolymers according to claim 1 wherein the monomer mixture comprises from SO to 95% by weight of methyl methacrylate, from 3 to 15% by weight of α-methylstyrene, from 0 to 8% by weight of styrene and from 2 to 8% by weight of maleic anhydride and the molar ratio of the sum of α-methylstyrene and styrene to maleic anhydride is from 1.0 to 25.

3. The process for production of methacrylic copolymers according to claim 1 wherein the monomer mixture further comprises from 0.0001 to 0.1 part by weight of a terpenoid compound per 100 parts by weight of the monomer mixture.

4. The process for production of methacrylic copolymers according to claim 1 wherein the polymerizing vessel is in the form of a bag.

5. A process for production of methacrylic copolymers, comprising:
    charging a monomer mixture comprising from 70 to 95% by weight of methyl methacrylate, from 0 to 15% by weight of α-methylstyrene, from 3 to 20% by weight of styrene and from 2 to 15% by weight of maleic anhydride into a polymerizing vessel containing at least one polymeric membrane layer having an oxygen permeability of $1.5 \times 10^{-13}$ (mol·m$^{-2}$·s$^{-1}$·Pa$^{-1}$) or below, wherein the molar ratio of the sum of α-methylstyrene and styrene to maleic anhydride is from 1.0 to 2.5,
    sealing the polymerizing vessel, and
    polymerizing the monomer mixture under heating in a gas phase.

6. The process for production of methacrylic copolymers according to claim 5 wherein the monomer mixture further comprises from 0.0001 to 0.1 part by weight of a terpenoid compound per 100 parts by weight of the monomer mixture.

7. The process for production of methacrylic copolymers according to claim 5 wherein the polymerizing vessel is in the form of a bag.

* * * * *

UNITED STATES PATENT AND TRADEMARK OFFICE
CERTIFICATE OF CORRECTION

PATENT NO.      : 6,716,951 B2
DATED           : April 6, 2004
INVENTOR(S)     : Marutani et al.

It is certified that error appears in the above-identified patent and that said Letters Patent is hereby corrected as shown below:

<u>Title page,</u>
Item [*] Notice, should read:
-- Subject to any disclaimer, the term of this
patent is extended or adjusted under 35
U.S.C. 154(b) by 12 days. --.

Signed and Sealed this

Eighteenth Day of October, 2005

JON W. DUDAS
*Director of the United States Patent and Trademark Office*

UNITED STATES PATENT AND TRADEMARK OFFICE
CERTIFICATE OF CORRECTION

PATENT NO.     : 6,716,951 B2
DATED          : April 6, 2004
INVENTOR(S)    : Takao Marutani et al.

It is certified that error appears in the above-identified patent and that said Letters Patent is hereby corrected as shown below:

<u>Title page,</u>
Item [75], Inventors, third inventor should read -- Yoshihiko, Sano, Aichi (JP) --.

Signed and Sealed this

Twenty-fourth Day of January, 2006

JON W. DUDAS
*Director of the United States Patent and Trademark Office*